Dec. 1, 1970   C. J. KERSHNER ET AL   3,544,307
PURIFICATION OF POLONIUM
Filed Oct. 30, 1968
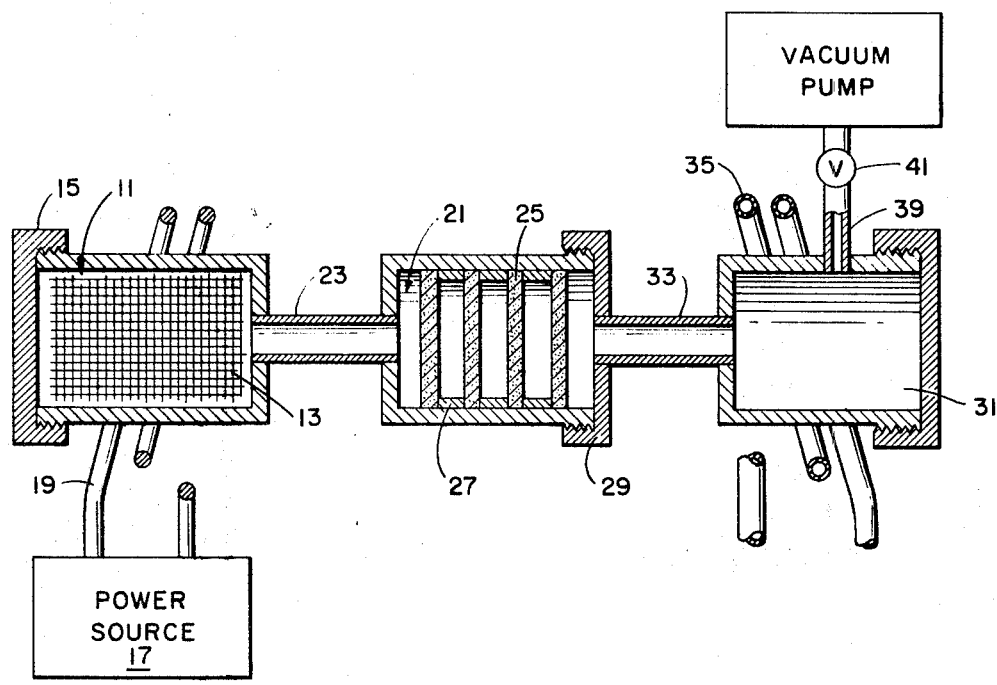
Carl J. Kershner
Robert E. Ellis
*INVENTORS*

United States Patent Office 3,544,307
Patented Dec. 1, 1970

3,544,307
PURIFICATION OF POLONIUM
Carl J. Kershner and Robert E. Ellis, Centerville, Ohio, assignors to the United States of America as represented by the United States Atomic Energy Commission
Filed Oct. 30, 1968, Ser. No. 772,073
Int. Cl. C22b 5/16
U.S. Cl. 75—84.1                             4 Claims

ABSTRACT OF THE DISCLOSURE

The purification and removal of oxygen from association with polonium comprising heating material to vaporize polonium and separate oxygen from its oxide, removing oxygen from the vapor by passing the vapor through or over tantalum powder, and thereafter collecting the purified polonium.

BACKGROUND OF INVENTION

Polonium–210 and its compounds are extensively used as radioactive heat source fuels. This radioisotope has a relatively high thermal output compared to other known radioisotopes and primarily emits alpha radiation, which is readily blocked or absorbed as compared to gamma or beta radiation. The alpha radiation emitted from polonium may react with light elements such as oxygen, boron, beryllium, lithium or the like to produce neutron emission. Neutron radiation is difficult to shield against and may initiate other nuclear reactions, break down plastic material encapsulating a heat source, or produce harmful radiobiological effects.

Polonium oxide is often an impurity in polonium–210 and may originate from polonium production processes. Polonium may be produced by the irradiation of bismuth and separated therefrom by electrodeposition of polonium onto platinum gauze from an oxidizing solution which may produce polonium oxide as a side reaction. Further formation of polonium oxide may result if the polonium plated platinum gauze is exposed to the atmosphere. The oxygen–17 and oxygen–18 isotopes is polonium oxide undergo reaction with alpha particles which may produce neutrons at a rate of about 200 neutrons per second per curie of polonium–210. In large heat sources such as about 5,000 curies significant neutron radiation may be produced which can result in substantial harm or a health hazard.

SUMMARY OF INVENTION

Therefore it is an object of the present invention to provide a method for producing polonium heat or alpha source material which does not give off substantial neutron radiation.

It is a further object of the invention to provide a method for removing oxygen from polonium.

It is also an object of the invention to provide a method which facilitates preparation of scandium subgroup compounds, e.g., polonium lanthanides and actinides.

Various other objects and advantages will become apparent from the following description of one embodiment of the invention.

The present invention comprises a method for separating oxygen from polonium material including heating the material to dissociate polonium oxide and vaporize polonium metal, contacting the vapor embodying polonium and dissociated oxygen with finely divided tantalum for achieving separation of the polonium and oxygen, and condensing the polonium as polonium metal or effecting preparation of such as polonium lanthanides or actinides.

DESCRIPTION OF DRAWINGS

The present invention is illustrated in the following drawings wherein the figure is a cross-sectional elevation view of apparatus for the removal of oxygen from polonium.

DETAILED DESCRIPTION

As shown, the apparatus which may be used to carry out the method of the present invention comprises a first chamber or compartment 11 which may contain a polonium-plated platinum gauze 13 or polonium metal in any other suitable form. Chamber 11 may have a removable closure 15 to facilitate depositing the platinum gauze therein or a suitable closure may be welded or otherwise permanently affixed over the opening to chamber 11 after the polonium metal has been positioned therein. A power source 17 and induction coil 19 or other suitable heat source may heat the polonium to temperatures of about 500° C. to about 900° C., which temperature range gives good results as to quantities of materials vaporized and times therefor.

Polonium melts at about 254° C., boils at 962° C. and therefore may exert a vapor pressure of several hundred millimeters of mercury at the temperatures provided in the heating chamber 11. Polonium oxide present in or associated with the polonium metal disproportionates or dissociates at about 500° C. to a vapor which embodies polonium and oxygen. Heating in chamber 11 at the noted temperature range may be continued for any period deemed suitable.

The vapor may flow into a chamber 21 through a conduit 23. Chamber 21 is shown containing a series or array of porous tablets or compacts 25 composed of particulate, powdered, or finely divided tantalum to maximize contacting area. The particulate or finely divided tantalum is preferably formed or pressed (under any suitable pressure) into tablets or compacts to prevent or minimize entrainment of tantalum dust in the vapor flow.

The tablets may be made from particles of about 60–150 U.S. Standard mesh and shaped and sized to closely fit in the cross section of chamber 21 roughly perpendicular to the vapor flow such that a predominance of the vapor permeates through the porous tablets. For purposes of description the tantalum of elements 25 is referred to herein as "finely divided" even though it may be compacted into a tablet for usage and handling. To avoid introducing unnecessary oxygen or other contaminants into the apparatus, the compacts may be heated to about 1000° C. for about one hour at about $10^{-4}$ to $10^{-5}$ torr to effect deaeration prior to positioning them in chamber 21. The compacts may be in contact with each other or spaced from each other and held in position such as by wedging against the chamber walls or by a plurality of structural members 27 which may be attached such as by welding between each pair. While four compacts are shown, it will be understood that a greater or lesser number may be employed, thicknesses being about ¼ to ½ inch. Tantalum in other forms than compacts or tablets may be used, such as machining scraps or turnings, powder, or pellets. Tantalum produced from chemically reducing tantalum hydride may be satisfactory, providing residual hydrogen is not deemed to excessively increase the pressure in a closed system or impede the flow of polonium vapor.

Chamber 21 may be closed at one end by a removable closure 29 to provide access to the array of tantalum tablets. Alternatively, chamber 21 may be permanently closed after inserting the tablets, such as by welding or otherwise fastening a suitable endplate onto the chamber.

The vapors generated in chamber 11 may pass through the pores and interstices of tablets 25, where oxygen is "pulled out" of the vapor or combines with the finely divided tantalum to form solid tantalum oxides. Even though polonium and oxygen are in the same group of the periodic table of elements it has been found that polonium is not pulled out of the vapor, as is the oxygen. The purified polonium vapors move from chamber 21 to condensation chamber 31, through a suitable conduit 33.

Chamber 31 and conduit 33, as well as chambers 11 and 21, may be prepared from sections of tantalum or tantalum-tungsten alloy tubing or other material which will withstand the high temperatures and not react or combine with polonium. Tantalum is advantageous for a construction material as it provides additional surface for removing oxygen from the vapors, without removing polonium. Merely by way of example, the chambers 11, 21, 31 may be provided from 3/8" tantalum tubing and the conduits 23 and 33 from 1/8" tantalum tubing.

Chamber 31 may be cooled by suitable means, e.g., by water or other coolant flowing through tubing 35 from a coolant source, to condense polonium in the chamber. If desired, polonium vapors reaching chamber 31 may be condensed by disposing chamber 31 outside and away from furnace or heater coil 19 such that the atmosphere may act as a sufficient coolant.

Air may be initially displaced or evacuated from the complete system including chambers 11, 21 and 31 and evacuation may be to a pressure of about 100 microns (0.1 torr), through vacuum connection 39 and valve 41. Vacuum connection 39 may be formed into any of the three chambers 11, 21, 31 for initial evacuation but may be useful during the process as a vacuum vent in condensation chamber 31 if noncondensibles should accumulate there.

After the polonium vapors have condensed, chamber 31 may be sealed by crimping or otherwise closing and disconnecting vacuum connection 39 and conduit 33. The purified polonium within chamber 31 may then be stored or fabricated into a heat or alpha source which will have neutron emission reduced to an acceptable level, for instance polonium-210 having an original neutron emission of 200 neutrons per second per curie may be reduced to 20 neutrons per second per curie by this method.

If desired, scandium, yttrium, the lanthanides, or the actinides, may be disposed in the chamber 31, for collecting the polonium vapors and subsequent heating to initiate reaction of polonium therewith to form radioactive heat source compositions.

The present invention provides a method and apparatus for its implementation for removing oxygen from the radioisotope polonium and thereby providing a heat and alpha source material which will not produce objectionable neutron radiation from the alpha-oxygen reactions. In addition a method is illustrated for producing rare earth compositions in combination with the resulting polonium.

It will be understood that various changes may be made in the details, materials and arrangement of the process steps herein described to explain the invention by those skilled in the art within the scope of the claims.

What is claimed is:

1. The method of removing oxygen from association with polonium which comprises confining the material polonium and its oxide in a chamber, removing air from the chamber, heating the material in the chamber to vaporize polonium and dissociate oxygen from the polonium, contacting said vaporized polonium and dissociated oxygen with finely divided tantalum to separate dissociated oxygen from the polonium vapor, and subsequently collecting the polonium of said vapor.

2. The method of claim 1, together with heating the finely divided tantalum to about 1000° C. prior to contacting with polonium vapor and dissociated oxygen to remove oxygen from the tantalum.

3. The method of claim 1, wherein said heating is conducted at a temperature of from about 500° C. to about 900° C.

4. The method of claim 1, wherein said collecting includes cooling and condensing of the polonium.

References Cited

UNITED STATES PATENTS 3,271,320   9/1966   Moore _____ 176—14 XR

CARL D. QUARFORTH, Primary Examiner

B. H. HUNT, Assistant Examiner

U.S. Cl. X.R.

75—62, 84; 176—16